F. TWYMAN.
METHOD OF GRADUATING RANGE FINDERS.
APPLICATION FILED NOV. 21, 1918.
1,306,320.
Patented June 10, 1919.
2 SHEETS—SHEET 1.
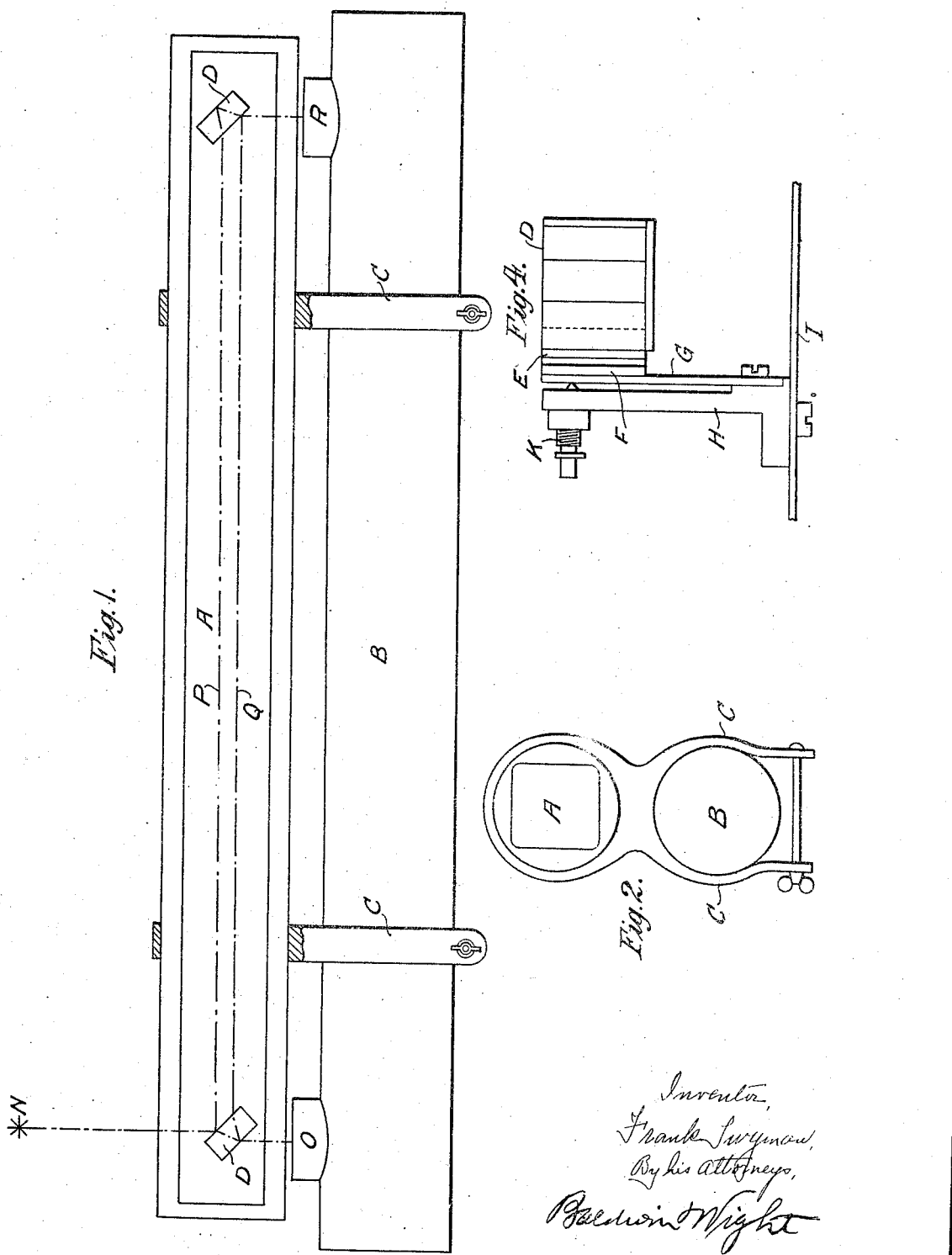

F. TWYMAN.
METHOD OF GRADUATING RANGE FINDERS.
APPLICATION FILED NOV. 21, 1918.
1,306,320.
Patented June 10, 1919.
2 SHEETS—SHEET 2.
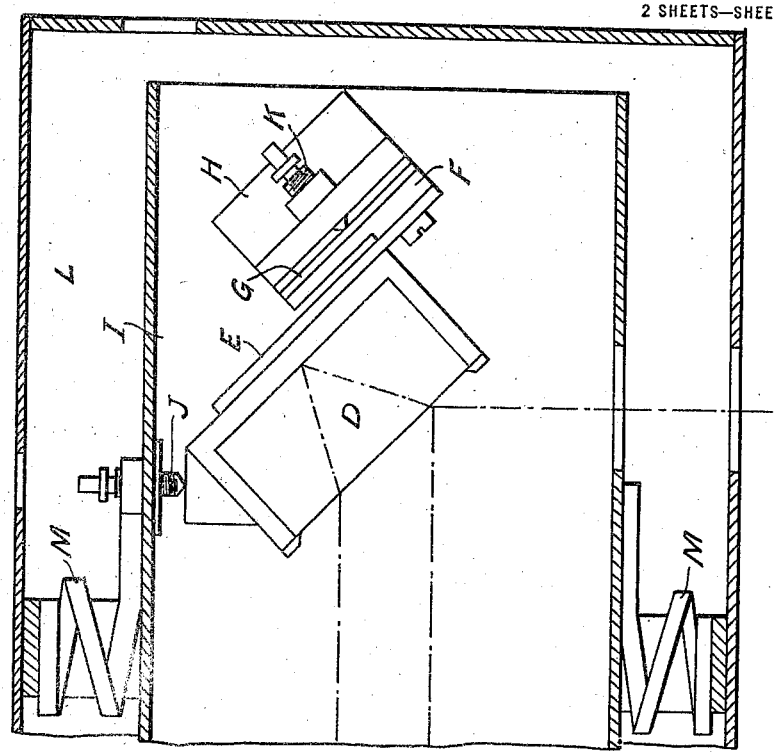
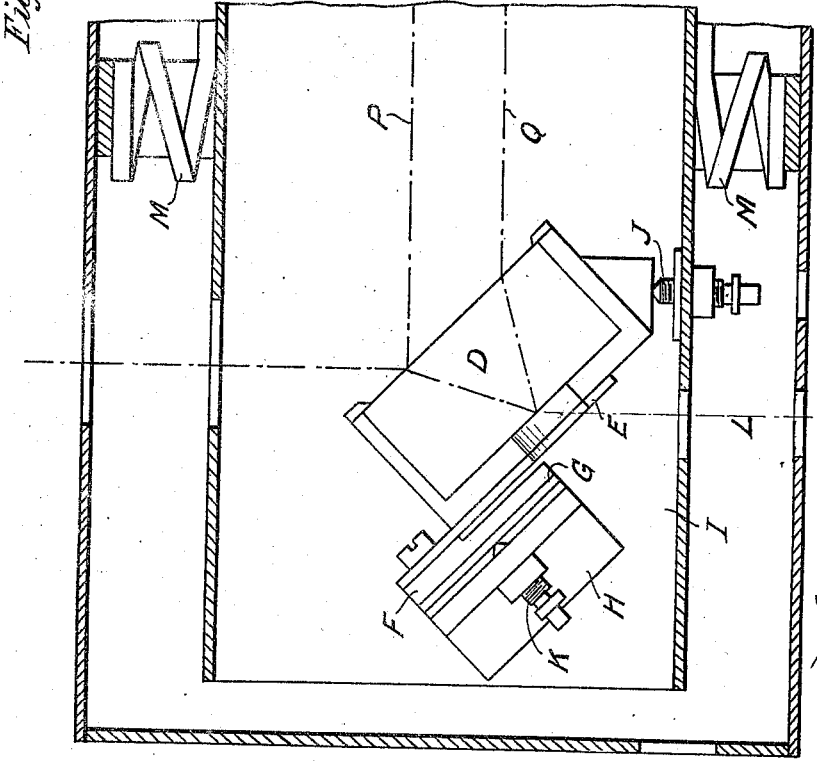
Fig. 3.

UNITED STATES PATENT OFFICE.

FRANK TWYMAN, OF LONDON, ENGLAND, ASSIGNOR TO ADAM HILGER, LIMITED, OF LONDON, ENGLAND.

METHOD OF GRADUATING RANGE-FINDERS.

1,306,320.　　　　　Specification of Letters Patent.　　Patented June 10, 1919.

Application filed November 21, 1918. Serial No. 263,624.

*To all whom it may concern:*

Be it known that I, FRANK TWYMAN, a subject of the King of Great Britain, residing at 75ᵃ Camden road, London, England, have invented a new and useful Improved Method of Graduating Range-Finders and Improvements in Apparatus for Use Therein, of which the following is a specification.

This invention relates to an improved method of adjusting the graduation of rangefinders and improvements in apparatus for use therein.

In the well known Jamin refractometer two parallel similar mirrors of thick glass are arranged so that light is admitted to one mirror and is divided by it into two beams, one beam being reflected from the front surface and the other from the back silvered surface. These beams pass to the surfaces of the other mirror and are superimposed under conditions suitable for interference.

According to the present invention, some of the silvering is removed from the back of the first mirror and the mirrors are arranged at such a distance from each other that the beams of light from them pass to the object glasses of the rangefinder. Thus a beam passes directly through the first mirror to one object glass of the rangefinder and beams reflected by both mirrors pass to the other object glass.

If light from a distant point is admitted to the first mirror and colored bands are seen in the field of the rangefinder, it is known that the mirrors are not parallel and they are manipulated until the field is of a uniform color. An image of the distant point will then be formed in each field of the rangefinder, the one by the direct beam and the other by the combined reflected beams which are now known to be accurately parallel to the direct beam.

The rangefinder is then adjusted until the images are coincident and if these images of the distant source of light are regarded by the observer as the images of an infinitely distant point and the rangefinder graduation is adjusted on this supposition its adjustment for the infinity point is accurately ascertained.

The drawings illustrate apparatus made in accordance with this invention. Figure 1 is a plan and Fig. 2 a side elevation of an apparatus for adjusting the graduation of a rangefinder with the rangefinder shown attached to it. Fig. 3 is a plan of the apparatus partly in section to a larger scale, and Fig. 4 is an elevation of one of the mirrors.

Referring to Figs. 1 and 2, A is the apparatus to which is attached a rangefinder B by means of clips C, C. D, D are similar mirrors of thick glass, and each mirror D is carried by a spring E fixed to a plate F, which is carried by another spring G fixed to a bracket H secured to the frame I. The spring E allows of movement about a vertical axis, which movement is effected by a setting screw J, and the spring G allows of movement about a horizontal axis which is effected by another setting screw K. The frame I is held in the casing L of the apparatus by springs M.

Referring to Fig. 1, it will be seen that light coming from a distant point N passes to one of the mirrors D where part of the light enters one of the object glasses O of the rangefinder B, while the rest of the light is divided into two beams P, Q, one beam P being reflected from the front surface and the other beam Q from the back silvered surface; these beams pass to the surfaces of the other mirror D and are superimposed under conditions suitable for interference and pass to the other object glass R. The graduation of the rangefinder is adjusted as set out above.

What I claim is:—

1. The method of adjusting the graduation of rangefinders, consisting in admitting a portion of a beam of light to one object glass of the rangefinder, dividing the remainder of said beam into a plurality of substantially parallelly extending beams, superimposing said parallelly extending beams under conditions suitable for interference, and passing said combined beam to the other object glass of the rangefinder.

2. The method of adjusting the graduation of range finders, which consists in producing divisions of a beam of light, one of said divisions comprising a unitary beam, and the other comprising a plurality of substantially parallelly extending beams, admitting said unitary beam to one object glass of the range finder, and superimposing said parallelly extending beams under conditions suitable for interference, and admitting the same to the other object glass of the range finder.

3. An apparatus for adjusting the graduation of range finders, comprising an angularly disposed mirror of thick glass having a portion only of its back silvered whereby light admitted to said mirror is partially transmitted therethrough and partially reflected from both the front and back thereof to form substantially parallelly extending beams, and a second similar mirror disposed to receive and superimpose under conditions suitable for interference said parallelly extending beams reflected by said first-mentioned mirror.

4. An apparatus for adjusting the graduation of range finders, consisting of two similar mirrors of thick glass adapted to reflect light from both surfaces, one of said mirrors having a portion only of its back silvered to reflect light, and having the remainder thereof transparent to transmit light therethrough, and means for adjusting one of said mirrors relatively to the other to eliminate interference.

5. An apparatus for adjusting the graduation of range finders, consisting of two similar mirrors of thick glass adapted to reflect light from both surfaces, one of said mirrors having a portion only of its back silvered to reflect light, and having the remainder thereof transparent to transmit light therethrough, and a support for each of said mirrors independently adjustable to eliminate interference.

6. An apparatus for adjusting the graduation of range finders, consisting of two similar mirrors of thick glass adapted to reflect light from both surfaces, one of said mirrors having a portion only of its back silvered to reflect light, and having the remainder thereof transparent to transmit light therethrough, and a compound spring support for each of said mirrors independently adjustable to eliminate interference.

In testimony that I claim the foregoing as my invention, I have signed my name this 31st day of October 1918.

FRANK TWYMAN.

Copies of this patent may be obtained for five cents each, by addressing the "Commissioner of Patents, Washington, D. C."